United States Patent
Sevenhuijsen et al.

(10) Patent No.: US 7,338,644 B2
(45) Date of Patent: Mar. 4, 2008

(54) FUEL PROCESSOR

(75) Inventors: Eric Sevenhuijsen, Amsterdam (NL); Hendrik Martinus Wentinck, Amsterdam (NL)

(73) Assignee: Shell Oil Company, Houston, TX (US)

( * ) Notice: Subject to any disclaimer, the term of this patent is extended or adjusted under 35 U.S.C. 154(b) by 665 days.

(21) Appl. No.: 10/257,723

(22) PCT Filed: Apr. 12, 2001

(86) PCT No.: PCT/EP01/04297

§ 371 (c)(1), (2), (4) Date: Oct. 15, 2002

(87) PCT Pub. No.: WO01/79112

PCT Pub. Date: Oct. 25, 2001

(65) Prior Publication Data

US 2003/0136051 A1    Jul. 24, 2003

(30) Foreign Application Priority Data

Apr. 17, 2000 (EP) .................. 00303202
Jul. 26, 2000 (EP) .................. 00306357

(51) Int. Cl.
*B01J 8/04* (2006.01)
*B01J 8/00* (2006.01)

(52) U.S. Cl. .......... 422/188; 48/61; 48/127.9; 422/170; 422/173; 422/198; 422/189; 422/190; 422/203

(58) Field of Classification Search ........ 422/198, 422/191; 48/61, 197 R, 199 R; 423/650; 429/17
See application file for complete search history.

(56) References Cited

U.S. PATENT DOCUMENTS

| 5,052,482 | A | 10/1991 | Gondouin |
| 5,985,474 | A * | 11/1999 | Chen et al. ............... 429/17 |
| 6,413,479 | B1 * | 7/2002 | Kudo et al. ............ 422/198 |
| 6,524,550 | B1 * | 2/2003 | Chintawar et al. ..... 423/650 |

FOREIGN PATENT DOCUMENTS

| EP | 0 600 621 | 6/1994 |
| EP | 0 629 578 | 12/1994 |

(Continued)

OTHER PUBLICATIONS

Recupero V et al: "Hydrogen generator. via catalytic partial oxidation of methane for fuel cells". Journal of Power Sources, CH. Elsevier Sequoia S.A. Lausanne, vol. 71, No. 1-2, Mar. 15, 1998 pp. 208-214.

*Primary Examiner*—Glenn Caldarola
*Assistant Examiner*—Kaity Handal

(57) ABSTRACT

A compact fuel processor for converting a hydro-carbonaceous fuel into hydrogen and carbon dioxide having in series a hydrocarbon conversion zone for converting the hydro-carbonaceous fuel into a product gas of carbon monoxide and hydrogen, a water-gas shift reaction zone containing a catalyst suitable for the water-gas shift conversion reaction, an auxiliary water-gas shift reaction zone containing a catalyst suitable for the water-gas shift conversion reaction, and a carbon monoxide removal zone. The invention further relates to a fuel cell system having such a fuel processor and a fuel cell and to the use of such a fuel processor or such a fuel cell system.

19 Claims, 3 Drawing Sheets

FOREIGN PATENT DOCUMENTS

| | | |
|---|---|---|
| EP | 0 861 802 | 9/1998 |
| EP | 0 922 666 | 6/1999 |
| EP | 0 773 906 | 5/2000 |
| WO | 98 08771 | 3/1998 |
| WO | 99 48805 | 9/1999 |
| WO | 00 00426 | 1/2000 |

* cited by examiner

FUEL PROCESSOR

The present invention relates to a fuel processor for converting a hydrocarbonaceous fuel into hydrogen and carbon dioxide. The invention further relates to the use of such a fuel processor, to an assembly comprising a fuel processor and a fuel cell and to the use of such an assembly.

Since fuel cell technology is emerging for various small-scale applications, there is a need for relatively small fuel processors that can convert a hydrocarbonaceous fuel into a hydrogen-rich gas, in order to provide the hydrogen to be oxidised in a fuel cell to generate electricity. Especially for the on-board production of hydrogen in fuel-cell-powered vehicles and for domestic systems for generating heat and power, compact fuel processors are needed.

A promising type of fuel cell for small-scale applications is the proton exchange membrane (PEM) fuel cell. Since the catalyst of this type of fuel cell is poisoned by carbon monoxide, the carbon monoxide content of the hydrogen-rich gas to be fed to a PEM fuel cell should be below 100 ppm, preferably below 50 ppm or even more preferred below 20 ppm.

Recently proposed fuel processors for the conversion of hydrocarbonaceous fuel into hydrogen and carbon oxides are based on steam reforming, partial oxidation or a combination thereof. Reference is made for example to WO99/48805, wherein a process for the catalytic generation of hydrogen from hydrocarbons that combines steam reforming and partial oxidation has been disclosed.

However, the carbon monoxide concentration of the product gas of a steam reformer or a partial oxidation zone is too high for direct conversion in a PEM fuel cell. Therefore, the carbon monoxide is generally converted into carbon dioxide by means of the water-gas shift reaction

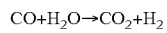
$$CO + H_2O \rightarrow CO_2 + H_2$$

followed removal of the remaining carbon monoxide, either by selective oxidation according to the reaction

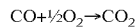
$$CO + \tfrac{1}{2}O_2 \rightarrow CO_2$$

or by methanation according to the reaction

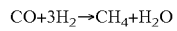
$$CO + 3H_2 \rightarrow CH_4 + H_2O$$

Fuel processors wherein the generation of a carbon monoxide containing hydrogen comprising gas, water-gas shift conversion and selective oxidation of carbon monoxide are integrated are known in the art.

In EP 861 802 is disclosed a fuel reforming apparatus wherein a liquid feed heating, an evaporation, a steam superheating, a reforming, a shift reaction, a selective CO oxidation, and a catalytic combustion portion are integrated. The different portions of the apparatus are constituted of flat plate heat exchange elements. The use of plate heat exchange elements requires high quality surface finishing and sealing in order to prevent gas leakage, especially during incidentally pressure rises as a result of misoperation.

It is an object of the present invention to provide for a compact fuel processor wherein the reaction zone for partial oxidation and/or steam reforming and the catalytic reaction zones for water-gas shift conversion and removal of the remaining carbon monoxide are integrated, preferably in a single vessel. Another object of the invention is to provide for a safe fuel processor, wherein the damage from accidental ignition can be easily contained. Still another object of the invention is to minimise the number of sealings in order to minimise leakage of gas to the surroundings. A further object is to provide for a fuel processor that can be manufactured at low costs, preferably from mass-produced parts.

Accordingly, the invention relates to a fuel processor for producing hydrogen and carbon dioxide as defined in claim 1.

The fuel processor of the invention will now be illustrated with reference to schematic FIGS. 1 to 3. The Figures are not drawn to scale.

Figure 1:
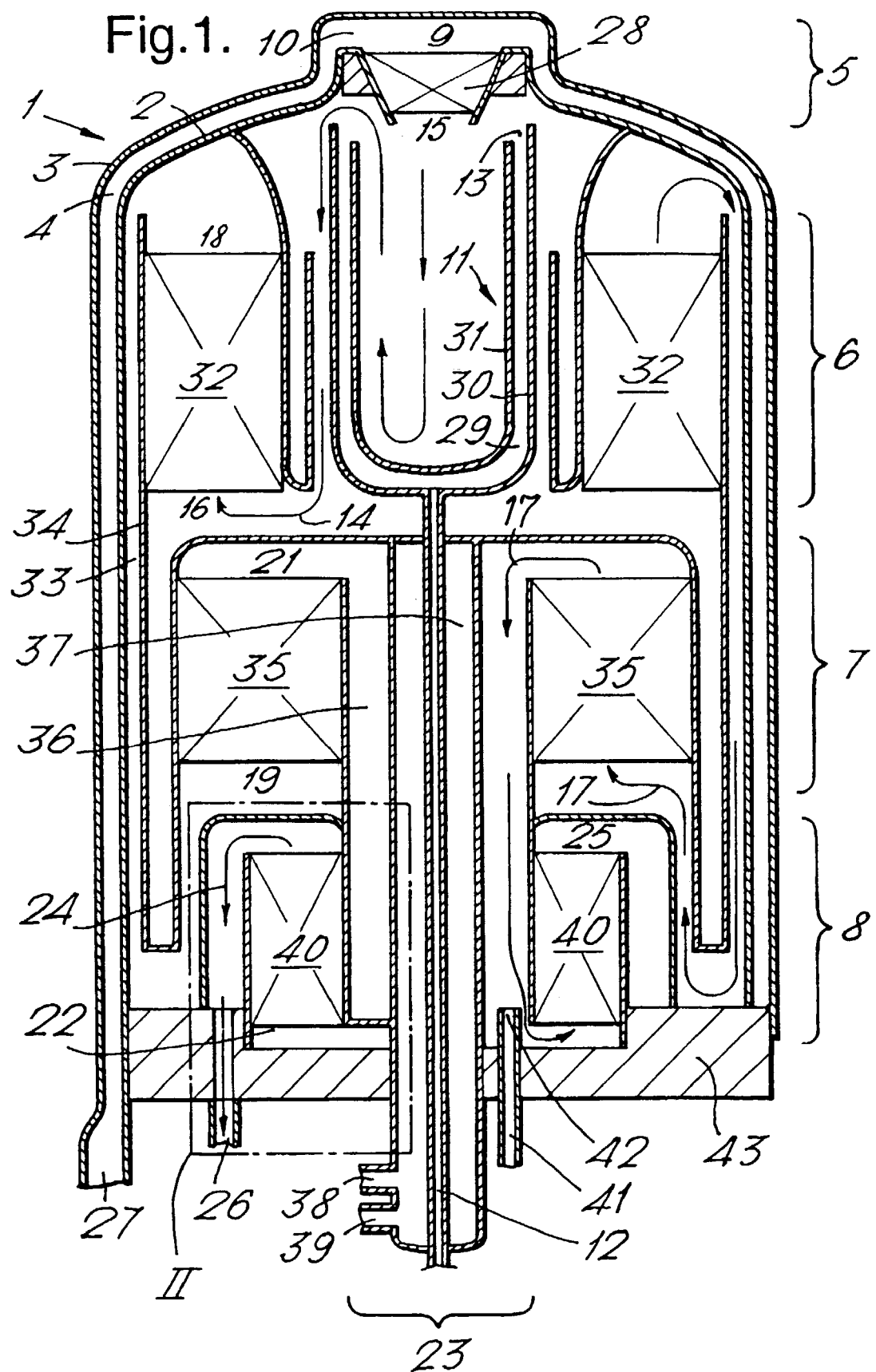
FIG. 1 shows a longitudinal section of a first embodiment of the fuel processor according to the invention.

The fuel processor shown in FIG. 1 comprises a vessel 1 having a double-walled cylindrical side wall consisting of an inner shell 2 and an outer shell 3 between which a first fluid path 4 is defined. In the vessel 1 are contained a hydrocarbon conversion zone 5 for the catalytic partial oxidation of a hydrocarbonaceous fuel into a first product gas, an annular water-gas shift reaction zone 6 for the water-gas shift conversion of the first product gas into a second product gas, an annular auxiliary water-gas shift reaction zone 7 for the water-gas shift conversion of the second product gas into a third product gas, and an annular carbon monoxide removal zone 8 comprising a catalyst for the selective oxidation of carbon monoxide in the third product gas.

The inlet 9 of the hydrocarbon conversion zone 5 is in fluid communication with the outlet 10 of the first fluid flow path 4.

The annular water-gas shift reaction zone 6 is arranged around an evaporator 11 into which a water supply conduit 12 debouches. The evaporator 11 has an outlet 13 for vapour.

In vessel 1 are further contained:
a second fluid flow path 14 extending from the outlet 15 of the hydrocarbon conversion zone 5 along the evaporator 11 and its outlet 13 for vapour to the inlet 16 of the water-gas shift reaction zone 6;
a third fluid flow path 17 extending from the outlet 18 of the water-gas shift reaction zone 6 along the inner surface of the inner shell 2 of the side wall of the vessel 1, via the auxiliary water-gas shift reaction zone 7, to the inlet 22 of the carbon monoxide removal zone 8, which flow path 17 includes part of a cooler 23 such that it extends through the warm side of the cooler 23; and
a fourth fluid flow path 24 extending from the outlet 25 of the carbon monoxide removal zone 8 to the outlet 26 of the vessel.

The first fluid path 4 has an inlet 27 through which, during normal operation, the reactants for the hydrocarbon conversion zone 5 are supplied. In the embodiment of FIG. 1, the vessel 1 is double-walled and an annular first fluid flow path 4 is defined between the inner 2 and outer shell 3 of the side wall. Alternatively, the vessel 1 may have a single side wall and a first fluid flow path defined by a helical conduit located at the outside of the side wall.

Preferably, the annular first fluid flow path 4 defined between the inner 2 and outer shell 3 contains a helical conduit (not shown) having an outlet which is in fluid communication with the inlet 9 of the hydrocarbon conversion zone 5, and an inlet at the opposite side of the conduit. Thus, reactants for the hydrocarbon conversion zone, e.g. hydrocarbonaceous fuel and molecular oxygen-containing gas, can be supplied separately to the hydrocarbon conversion zone 5. The outlet of the helical conduit may be located in the annular first fluid path 4 at some distance from the outlet 10 of the annular first fluid path 4, such that the reactants can already be mixed in the downstream part of the annular first fluid path 4.

The hydrocarbon conversion zone 5 is suitable for converting a hydrocarbonaceous fuel into a first product gas comprising hydrogen and carbon monoxide and is a catalytic partial oxidation zone. In the catalytic partial oxidation reaction, a mixture of a fuel and an oxygen-containing gas is contacted with a suitable catalyst and converted in an exothermic reaction into a mixture of carbon monoxide and hydrogen. If the fuel is a hydrocarbon, the reaction is as follows:

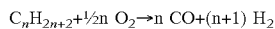

$$C_nH_{2n+2} + \tfrac{1}{2}n\, O_2 \rightarrow n\, CO + (n+1)\, H_2$$

The catalytic partial oxidation process and suitable catalysts for this process are known in the art, for example from EP 629 578, EP 773 906, and WO 00/00426. The catalyst is usually in the form of a fixed arrangement of catalyst carrier provided with catalytically active metal(s) and, optionally, a promoter. The catalyst carrier may be a refractory oxide, a metal, or a combination thereof. Suitable fixed arrangements are a fixed bed of catalyst carrier particles, a ceramic or metal monolithic structure such as a foam or a honeycomb, an arrangement of metal wire or gauze, or a combination thereof.

In the embodiment shown in FIG. 1, the hydrocarbon conversion zone comprises catalyst 28 in the form of a ceramic foam provided with catalytically active metals suitable for the partial oxidation of a hydrocarbonaceous fuel.

Preferably, the hydrocarbon conversion zone 5 is located in the top of the vessel, such as in the embodiment shown in FIG. 1. The inlet of the hydrocarbon conversion zone is preferably located at its upper end.

During normal operation of the fuel processor according to the invention shown in FIG. 1, a hydrocarbonaceous fuel and an molecular oxygen-containing gas, preferably air, are charged via inlet 27 and flow through the first fluid flow path 4 to the hydrocarbon conversion zone 5. The hydrocarbonaceous fuel may be a gaseous or liquid fuel, such as hydrocarbons and/or oxygenates. The fuel is gaseous when contacting catalyst 28. Therefore, if a liquid fuel is used, it is vaporised in the first fluid flow path 4. Preferred hydrocarbonaceous fuels are gaseous hydrocarbons such as methane, natural gas, ethane, propane, and liquefied petroleum gas (LPG).

At the inlet 9 of the hydrocarbon conversion zone 5, the temperature of the mixture of reactants is generally in the range of from 250 to 400° C. Optionally, additional reactants such as steam are supplied to the hydrocarbon conversion zone through an additional conduit (not shown) or through the first fluid flow path 4.

The hydrocarbonaceous fuel is partially oxidised into a first product gas comprising carbon monoxide and hydrogen, usually having a temperature in the range of from 750 to 1100° C. at the outlet 15 of catalyst 28. If methane is used as fuel, the carbon monoxide concentration in the first product gas is typically in the range of from 15 to 20% by volume, based on the dry product gas.

The first product gas flows through the second fluid flow path 14 to the water-gas shift reaction zone 6. Since the second fluid flow path extends along the evaporator 11 and its outlet 13 for vapour, the hot first product gas causes evaporation of water in evaporator 11, resulting in cooling of the first product gas, and water vapour is entrained with the first product gas to the water-gas shift reaction zone 6.

In the embodiment shown in FIG. 1, the evaporator 11 is in the form of a double-walled receptacle defining a water reservoir 29 between its two walls 30, 31 into which the water supply conduit 12 debouches. The water reservoir 29 has an annular outlet 13 for vapour at its upper end.

The temperature of the gases entering the water-gas shift reaction zone 6 may be set at a desired temperature by adjusting the water supply through conduit 12 to the evaporator 11.

Part of the carbon monoxide in the first product gas is shifted with the water vapour to carbon dioxide and hydrogen in the water-gas shift reaction zone 6. This reaction zone 6 is arranged around the evaporator 11 and comprises a catalyst 32 in the form of an annular fixed arrangement suitable for the water-gas shift conversion. Such catalysts are known in the art.

The water-gas shift conversion is an exothermic reaction. In the preferred embodiment wherein the fixed arrangement of catalyst 32 is not cooled internally, the temperature of the gas leaving the catalyst is higher than the temperature of the gases entering the catalyst.

Preferably, the water-gas shift reaction zone 6, is a zone for the high-temperature water-gas shift reaction. Catalysts for this reaction are known in the art. Typically, these catalysts are promoted chromium-iron oxide catalysts. The reaction typically operates at 300-500° C. Typically, the temperature of the gases at the inlet 16 of the water-gas shift reaction zone 6 is in the range of from 300 to 450° C., preferably 350 to 400° C. and the temperature of the gas leaving catalyst 32 at the outlet 18, i.e. the second product gas, is typically in the range of from 350 to 530° C., preferably 400 to 480° C. The carbon monoxide concentration in the second product gas is usually in the range of from 2 to 5% by volume, based on the dry product gas.

The second product gas flows from the outlet 18 of the water-gas shift reaction zone 6 through the third fluid flow path 17 extending along the inner surface of the inner surface of the inner shell 2 of the side wall of the vessel 1 to the inlet 19 of the auxiliary water-gas shift reaction zone 7. The third flow path 17 comprises an annular space 33 that is defined by the inner shell 2 and plate 34. The second product gas flowing in the annular space 33 is in counter-flow heat-exchange relationship with the reactants of the hydrocarbon conversion zone that flow through the first fluid flow path 4. This results in cooling of the second product gas, typically from a temperature in the range of from 400 to 480° C. at the outlet 18 of the water-gas shift reaction zone 6 to a temperature in the range of from 180 to 220° C. at the inlet 19 of the auxiliary water-gas shift reaction zone 7. If needed in order to achieve the desired temperature at the inlet 19 of the auxiliary water-gas shift reaction zone 7, additional cooling at the side wall 2, 3 of the vessel 1 may be applied.

The annular auxiliary water-gas shift reaction zone 7 comprises a catalyst 35 in the form of an annular fixed arrangement suitable for the water-gas shift conversion, preferably for the low-temperature water-gas shift conversion. Low-temperature shift catalysts are known in the art and typically are copper-zinc catalysts supported on alumina.

In this zone 7, part of the remaining carbon monoxide in the second product gas is water-gas shifted with the remaining water into carbon dioxide. The reaction typically operates at 190-240° C. The temperature of the effluent of the auxiliary water-gas shift reaction zone, the third product gas, at the outlet 21 of the auxiliary water-gas shift reaction zone 7 will typically be in the range of from 210 to 270° C., due to an adiabatic temperature increase. The carbon monoxide concentration in the third product gas is typically in the range of from 0.1 to 0.6% by volume, based on the dry product gas.

The third product gas flows from the outlet 21 of the auxiliary water-gas shift reaction zone 7 to the inlet 22 of the carbon monoxide removal zone 8. Between the outlet 21 of the auxiliary water-gas shift reaction zone 7 and the inlet 22 of the carbon monoxide removal zone 8, fluid flow path 17 includes a cooler 23. Cooler 23 comprises an annular space 36, i.e. the warm side of the cooler, surrounding a coolant circuit 37 having an inlet 38 and an outlet 39 for coolant. The annular space 36 forms part of fluid flow path 17. Preferably, the cooler 23 is centrally arranged in vessel 1. In the embodiment of FIG. 1, the cooler 23 is surrounding water supply conduit 12. Alternatively, the cool side of the cooler may be formed by water supply conduit 12.

Typically, the third product gas is cooled from a temperature in the range of from 210 to 270° C. at the outlet 21 of the auxiliary water-gas shift reaction zone to a temperature in the range of from 120-170° C. at the inlet 22 of the carbon monoxide removal zone.

The annular carbon monoxide removal zone 8 comprises a catalyst 40 in the form of a fixed arrangement suitable for the selective oxidation of carbon monoxide. Such catalysts are known in the art and usually comprise one or more noble metals on a refractory oxide catalyst carrier. Suitable fixed arrangements of catalyst may be a fixed bed of catalyst particles, i.e. catalyst carrier particles provided with noble metal(s), or a ceramic or metal monolithic catalyst support coated with the catalyst. During normal operation, the remaining carbon monoxide in the third product gas is selectively oxidised to carbon dioxide in this zone to obtain an effluent having a carbon monoxide concentration of less than 100 ppmv, preferably less then 50 ppmv, more preferable less than 20 ppmv. The molecular oxygen-containing gas, usually air, required for this reaction is supplied to the carbon monoxide removal zone 8 through supply conduit 41 having an outlet 42 that is in fluid communication with inlet 22 of the carbon monoxide removal zone 8. In order to achieve good mixing of the air with the third product gas before contacting catalyst 40, it is preferred that the outlet 42 of air supply conduit 41 is located in the annular space 36 of cooler 23, such as shown in the embodiment of FIG. 1.

The operating temperature of the selective oxidation reaction is typically in the range of from 100 to 200° C. Ideally, in order to achieve optimum selectivity, the temperature within zone 8 is kept as constant as possible, i.e. steep temperature gradients within the fixed arrangement of catalyst are minimised. Therefore, the fixed arrangement of catalyst 40 of zone 8 is preferably mounted on a flange 43 that can remove the heat produced in the exothermic selective oxidation reaction. In the embodiment shown in FIG. 1, flange 43 is cooled by the cooling water of cooler 23. Flange 43 may be provided with additional cooling means. It is preferred that flange 43 is located at the outside of the vessel 1, for example the bottom of the vessel such as shown in FIG. 1, since this facilitates heat removal.

Preferably, in order to minimise temperature gradients in zone 8, the fixed arrangement of catalyst of zone 8 comprises a metal foam as catalyst support provided with the catalyst, more preferably the catalyst is coated on the metal foam.

Preferably, in order to broaden the operating window, especially with respect to throughput, zone 8 comprises two catalyst beds for the selective oxidation of carbon monoxide which are arranged in series. In the embodiment of zone 8 shown in FIG. 2, the fixed arrangement of catalyst 40 as shown in FIG. 1 is now depicted by two separate catalyst beds 44 and 45. The fuel processor comprises a second supply conduit 46 for supplying molecular oxygen-containing gas, preferably air, to the second catalyst bed 45. The outlet 47 of second supply conduit 46 is located in the fluid flow path 48 extending from the outlet 49 of the first catalyst bed 44 to the inlet 50 of the second catalyst bed 45. The fluid flow path 48 may comprise a helical coil 51 to increase the length of the fluid flow path and thereby improving mixing of air with the effluent of the first catalyst bed 44.

If the carbon monoxide removal zone contains two catalyst beds for the selective oxidation of carbon monoxide, arranged in series and mounted on a flange, the flange may be advantageously used to remove heat from the effluent of the first catalyst bed in that zone before it enters the second catalyst bed.

In the embodiment of the invention as shown in FIG. 1, the vessel 1 of the fuel processor of the invention contains in sequence, in longitudinal direction the water-gas shift reaction zone 6, the auxiliary water-gas shift reaction zone 7, and the carbon monoxide removal zone 8. An advantage of such an arrangement is that, during normal operation, the temperature is decreasing from one side of the vessel to the other, i.e. from the water-gas shift reaction zone to the carbon monoxide removal zone, thereby minimising heat losses.

Since the water-gas shift conversion reaction is exothermic and the catalysts of zones 6 and 7 are usually not internally cooled, the temperature at the outlet of these zones is usually higher than that at the inlet. In order to maintain a constantly decreasing temperature in longitudinal direction of the vessel in the above-described preferred arrangement, it is preferred that the inlet of the water-gas shift reaction zone is located at the side of the auxiliary water-gas shift reaction zone and the outlet of the water-gas shift reaction zone at the side of the hydrocarbon conversion zone and that inlet of the auxiliary water-gas shift reaction zone is located at the side of the carbon monoxide removal zone and the outlet of the auxiliary water-gas shift reaction zone at the side of the water-gas shift reaction zone.

Figure 2:
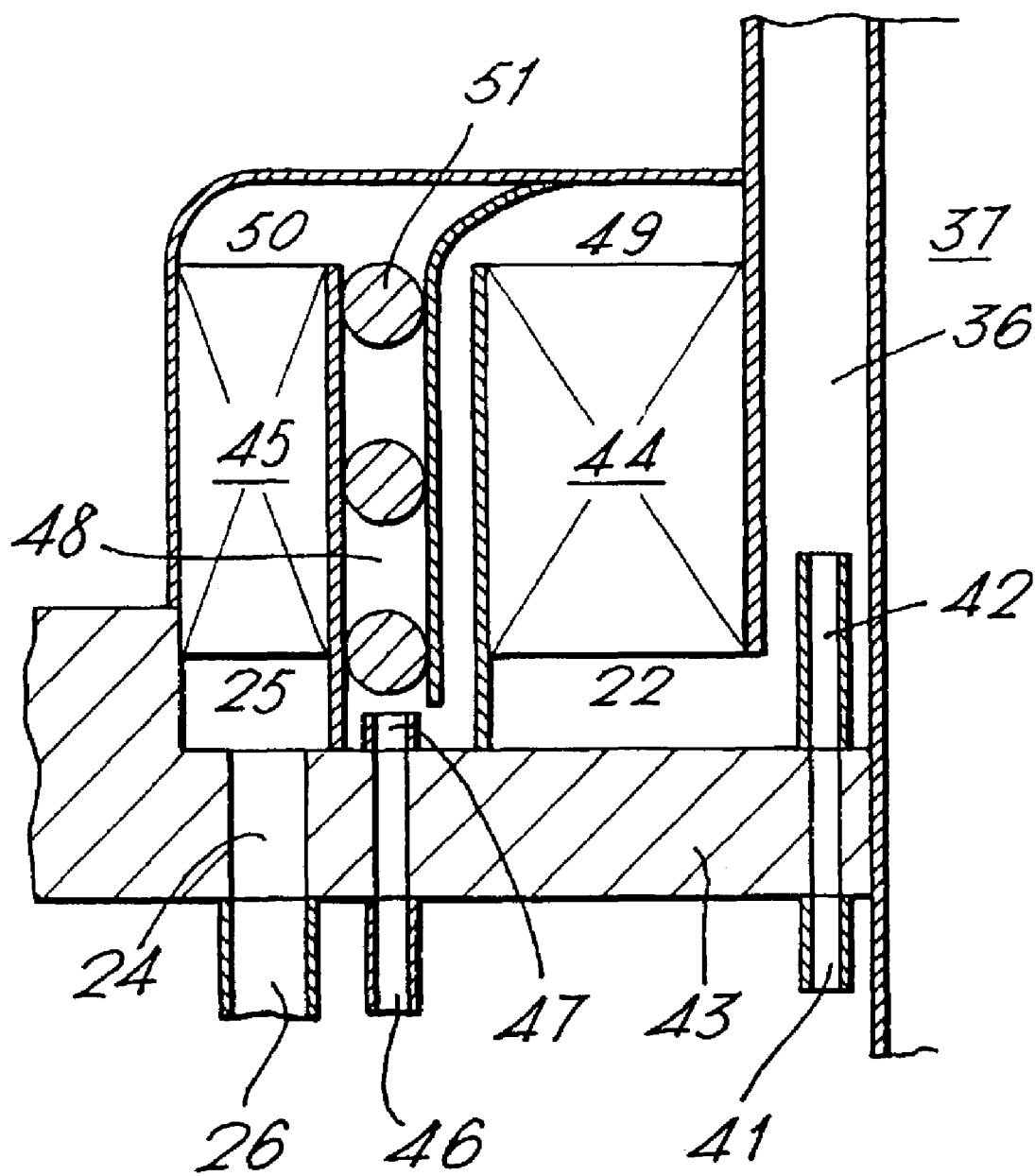
FIG. 2 shows section II of FIG. 1, drawn to a larger scale, with an alternative embodiment of the carbon monoxide removal zone.
Figure 3:
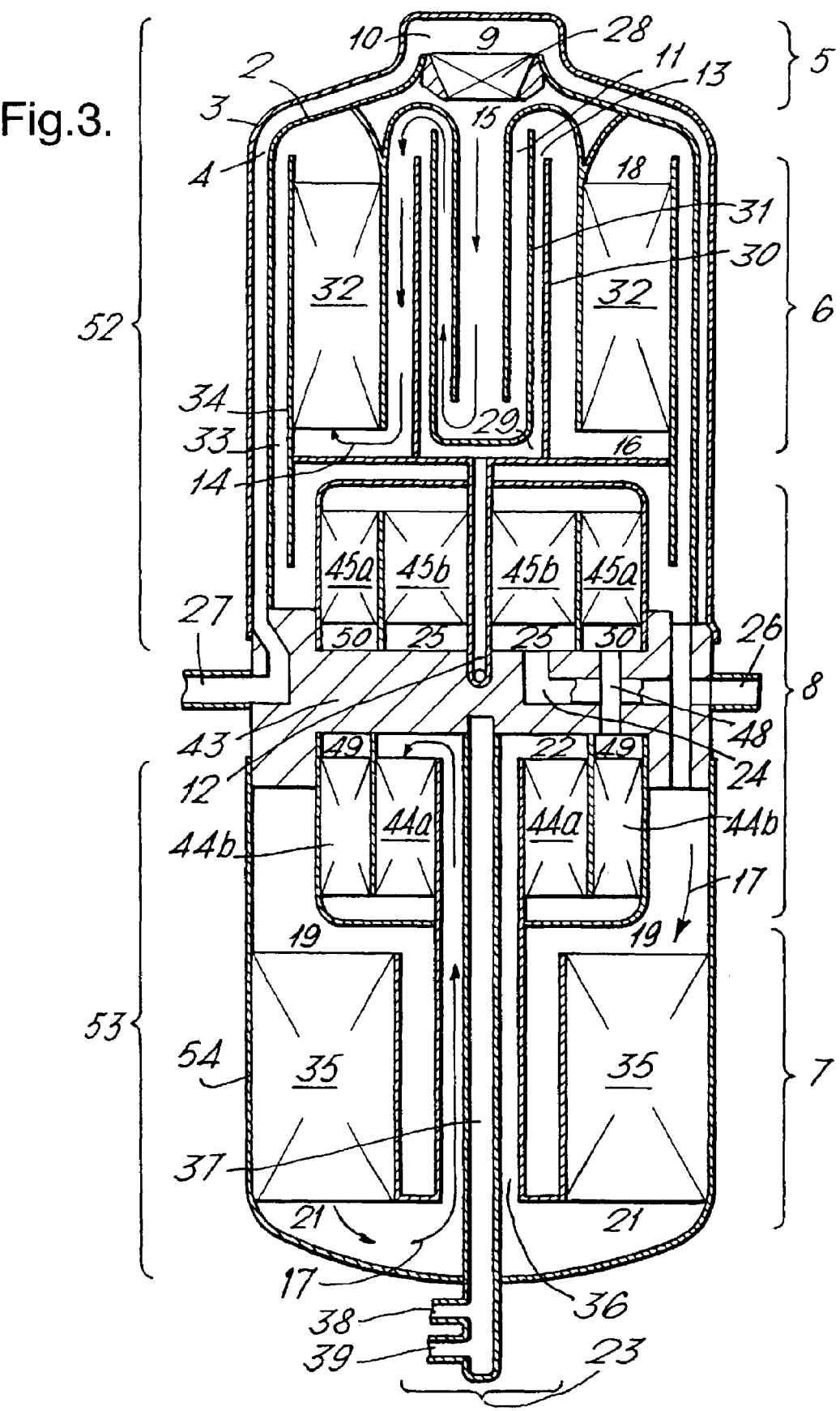
FIG. 3 shows a longitudinal section of a second embodiment of the fuel processor according to the invention which is particularly suitable for a large throughput of fuel.

In FIG. 3 is shown a second embodiment of the fuel processor according to the invention. In FIG. 3, parts similar to parts drawn in FIG. 1 or 2 are referred to with the same reference numerals. The embodiment shown in FIG. 3 differs from the embodiment shown in FIG. 1 in that the vessel is separated into two parts 52 and 53 by flange 43, located in the middle of the vessel. The embodiment shown in FIG. 3 is especially suitable if, starting from the embodiment shown in FIG. 1, the throughput has to be increased to about twice the original value. By using the same moulds for the side walls of the vessel, a processor having the double capacity can be constructed.

The first part 52 of the vessel has a double walled side wall defining the first fluid flow path 4 between its inner 2 and outer shell 3. The first part 52 of the vessel contains the hydrocarbon conversion zone 5, the water-gas shift reaction zone 6, which is arranged around the evaporator 11, and part of the carbon monoxide removal zone 8. The second part 53 of the vessel has a single side wall 54 and contains the auxiliary water-gas shift reaction zone 7 and part of the carbon monoxide removal zone 8.

As in the embodiment shown in FIG. 1, the reactants for the hydrocarbon conversion zone are supplied via the first fluid flow path 4 to the hydrocarbon conversion zone 5 where a first product gas is formed. The first product gas flows via the second fluid path 14 along the evaporator 11 and its opening for vapour 13 to the inlet 16 of the water-gas shift reaction zone 6 where it is converted into a second product gas. The second product gas flows via the third fluid flow path 17 to the inlet 19 of the auxiliary water-gas shift reaction zone. The third fluid flow path 17 extends along the inner surface of side wall 3 and through flange 43 to the inlet 19 of the auxiliary water-gas shift reaction zone 7. In the auxiliary water-gas shift reaction zone the second product gas is converted into a third product gas, which flows from the outlet 21 of the auxiliary water-gas shift reaction zone to the inlet 22 of the carbon monoxide removal zone.

In the embodiment shown in FIG. 3, zone 8 has two catalyst beds 44, 45 for the selective oxidation of carbon monoxide, each bed divided in a first 44a, 45a and a second part 44b, 45b of the bed. The first catalyst bed 44a, 44b is contained in the second part 53 of the vessel and the second bed 45a, 45b is contained in the first part 52 of the vessel. During normal operation, the effluent of the first catalyst bed 44 flows via fluid flow path 48 to the second catalyst bed 45. Air is supplied to the inlet 22 of the first catalyst bed 44 and to the inlet 50 of the second catalyst bed 45 via air supply conduits (not shown) that extend through flange 43.

In the preferred embodiments shown in FIGS. 1 and 3, the fuel processor contains two reaction zones for water-gas shift conversion, i.e. reaction zones 6 and 7. Alternatively, the fuel processor may contain a single reaction zone for catalytic water-gas shift conversion, preferably a zone for medium temperature shift conversion (MTS). Suitable MTS catalysts are known in the art.

Instead of an evaporator, the fuel processor according to the invention may comprise another type of steam generator, for example a vaporiser. The steam generator is located such that, during normal operation of the fuel processor according to the invention, the heat required for steam generation is provided by heat exchange with the product gas comprising carbon monoxide and hydrogen from the hydrocarbon conversion zone.

In the fuel processor according to the invention, the effluent gas of the water-gas shift reaction zone, i.e. reaction zone 6 in FIGS. 1 and 3, is cooled against the fluid flowing in the first fluid flow path, i.e. the flow path in or at the outside of the side wall of the vessel. In the preferred embodiments shown in FIGS. 1 and 3, the effluent gas from the water-gas shift reaction zone is cooled against the reactants for the hydrocarbon conversion zone, i.e. zone 5. Alternatively, the effluent may be cooled against a different fluid flow. It will be appreciated that in that case, the outlet 10 of the first fluid flow path 4 is not in fluid communication with the inlet 9 of the hydrocarbon conversion zone 5. For example, if the fuel processor according to the invention is combined with a fuel cell and a catalytic after burner for combusting the off-gases of the fuel cell, it may be advantageous to pre-heat the reactants for the hydrocarbon conversion zone by heat exchange with the flue gas of the catalytic after burner and to use the air needed for the catalytic after burner for cooling the effluent of the water-gas shift reaction zone by supplying it to the after burner via the first fluid flow path.

The fuel processor according to the invention is very compact. Preferably, the volume of the vessel is at most 40 litres, more preferably at most 25 litres, even more preferably at most 15 litres. Due to its compactness, heat losses are relatively low and the efficiency of the fuel processor has been found to remain constant at turn-down ratios in the range of from 1:5 to 1:10. Reference herein to efficiency is to the lower heating value (LHV) of the hydrogen produced divided by the LHV of the hydrocarbonaceous feedstock.

It is an advantage of the fuel processor according to the present invention that some internal leakage of gases between the various reaction zones is allowed, without adversely affecting the carbon monoxide concentration of the product gas, i.e. the effluent of the carbon monoxide removal zone. The arrangement of the different reaction zones is such that leakage of a part of the first product gas to the auxiliary water-gas shift reaction zone or of a part of the second product gas to the carbon monoxide removal zone will not adversely affect the performance of the fuel processor. As a results, gas-tight sealings between the different parts of the fuel processor are not required and the fuel processor can, for example, be constructed from mass-produced deep-drawn parts that may be assembled by simply pressing the parts together.

Moreover, the construction of the fuel processor according to the invention is such that a flame extinguishing zone exist between the hydrocarbon conversion zone and water-gas shift reaction zone on one hand and the auxiliary water-gas shift reaction zone and carbon monoxide removal zone on the other hand. The annular space 33 between inner side wall 2 and plate 34 acts as a quenching zone. Further, the hydrocarbon conversion zone and water-gas shift reaction zone on the one hand and the auxiliary water-gas shift reaction zone and carbon monoxide removal zone on the other hand are contained in compartments that are more or less separated from each other by the internals of the fuel processor. In the event that an unwanted explosion would occur in one of the compartments, the energy of the explosion will be absorbed by the deformation of the internals separating the compartments, resulting in a diminished force on the side wall of the vessel.

Since the fuel processor according to the invention is able to convert a hydrocarbonaceous fuel into a hydrogen-containing gas having less than 100 ppm carbon monoxide, it is particularly suitable to be used in combination with a fuel cell, especially a PEM fuel cell. Therefore, the present invention also relates to a fuel cell system comprising the above-defined fuel processor and a fuel cell, in particular a PEM fuel cell.

In further aspects, the invention relates to the use of a fuel processor as hereinbefore defined for the conversion of a hydrocarbonaceous fuel into a gas stream comprising hydrogen and carbon dioxide having less than 100 ppm carbon monoxide, and to the use of the above-defined fuel cell system for the conversion of a hydrocarbonaceous fuel into electric energy.

The present invention will be further illustrated by the following example.

EXAMPLE

Fuel Processor

Natural gas was converted into a hydrogen-rich gas in a fuel processor according to the invention having a construction similar to that illustrated in FIG. 1, but having a carbon monoxide removal zone as shown in FIG. 2.

The hydrocarbon conversion zone contained a catalyst for the catalytic partial oxidation of hydrocarbons in the form of a 65 ppi (pores per inch) yttria-containing partially-stabilised zirconia foam (Y-PSZ) that had been provided with 2.5% by weight of iridium, 2.5% by weight of rhodium and 7% by weight of zirconium. The catalyst had been prepared by impregnating a 65 ppi Y-PSZ foam with a solution comprising iridium tetrachloride, rhodium trichloride, and zirconyl nitrate and subsequently drying and calcining the impregnated foam.

The water-gas shift reaction zone contained a fixed bed of pellets of a commercially available iron-based HTS (high temperature shift) catalyst (ICI-Katalco-71-5m).

The auxiliary water-gas shift reaction zone contained a fixed bed of pellets of a commercially available zinc-copper-based LTS (low temperature shift) catalyst (ICI-Katalco-83-3 mr).

The carbon monoxide removal zone contained two annular foams of a commercially available aluminium alloy (DUOCEL, ex. ERG, Oakland, USA)(DUOCEL is a trademark) coated with a catalyst for the selective oxidation of carbon monoxide. The catalyst comprised Ru and Pt on an alpha-alumina carrier.

The total volume of the vessel was 10 L; the volumes of the individual reaction zones were as follows:
hydrocarbon conversion zone (CPO) 0.02 L;
water-gas shift reaction zone (HTS) 1.5 L;
auxiliary water-gas shift reaction zone (LTS) 1.5 L;
carbon monoxide removal zone first catalyst bed (SelOx I) 0.5 L, second catalyst bed (SelOx II) 0.5 L.

Natural Gas Conversion

A stream of natural gas (0.18 g/s) was supplied via a helical conduit (not shown in FIG. 1), spiralling in upward direction in the first fluid flow path 4, to the inlet 9 of the hydrocarbon conversion zone and air (0.78 g/s) was supplied via inlet 27 and first fluid flow path 4 to inlet 9. The temperature of the resulting feed mixture at inlet 9 was 350-400° C., the pressure 1.2 bar (absolute).

The temperatures at the inlet and outlet of each reaction zone and the carbon monoxide concentration at each outlet was measured. The results are given in the Table below. CO concentrations are base on the volume of dry product gas. The amount of water evaporated was 0.26 g/s. The amount of hydrogen produced was 28.6 Nl/min.

TABLE

| Reaction zone | location | temperature (° C.) | CO concentration (% by volume) |
|---|---|---|---|
| CPO | inlet | 350-400 | |
| | outlet | 800-900 | 16-18 |
| HTS | inlet | 350-400 | |
| | outlet | 430-480 | 2-3 |
| LTS | inlet | 190-220 | |
| | outlet | 220-250 | 0.2-0.4 |
| SelOx | inlet I | 120-170 | |
| | outlet I | 120-170 | |
| | inlet II | 120-170 | |
| | outlet II | 120-170 | <10 ppmv |

We claim:

1. A fuel processor for converting a hydrocarbonaceous fuel into hydrogen and carbon dioxide comprising:
   (a) a vessel having an at least partly double-walled cylindrical side wall comprising an inner shell and an outer shell, and an outlet;
   (b) a first fluid flow path, defined between the inner shell and the outer shell of the side wall, having an inlet and an outlet;
   (c) an exothermic partial oxidation zone for converting the hydrocarbonaceous fuel into a product gas comprising carbon monoxide and hydrogen having an inlet and an outlet;
   (d) a steam generator;
   (e) a water-gas shift reaction zone having an inlet and an outlet and containing a catalyst suitable for the water-gas shift conversion reaction;
   (f) a second fluid flow path extending from the outlet of the exothermic partial oxidation zone, along the steam generator, to the inlet of the water-gas shift reaction zone;
   (g) a carbon monoxide removal zone having an inlet and an outlet, which zone contains a catalyst suitable for selectively oxidising carbon monoxide or for methanation of carbon monoxide;
   (h) a third fluid flow path extending from the outlet of the water-gas shift reaction zone, along the inner surface of the inner shell of the side wall of the vessel, to the inlet of carbon monoxide removal zone, which third fluid flow path is in heat-exchange contact with the first fluid flow path; and
   (i) a fourth fluid flow path extending from the outlet of the carbon monoxide removal zone to the outlet of the vessel, wherein the exothermic partial oxidation zone, the steam generator, the water-gas shift reaction zone, and the carbon monoxide removal zone are contained in the vessel.

2. The fuel processor of claim 1, wherein in longitudinal direction, the vessel contains in sequence the water-gas shift reaction zone and the carbon monoxide removal zone.

3. The fuel processor of claim 1, further comprising an auxiliary water-gas shift reaction zone which is contained in the vessel and which has an inlet and an outlet, which auxiliary water-gas shift reaction zone contains a catalyst suitable for the water-gas shift conversion reaction, and wherein the third fluid flow path extends from the outlet of the water-gas shift reaction zone, along the inner surface of the inner shell of the side wall of the vessel, via the auxiliary water-gas shift reaction zone to the inlet of the carbon monoxide removal zone and includes a cooler between the outlet of the auxiliary water-gas shift reaction zone and the inlet of the carbon monoxide removal zone.

4. The fuel processor of claim 3, wherein, in longitudinal direction, the vessel contains in sequence the water-gas shift reaction zone, the auxiliary water-gas shift reaction zone, and the carbon monoxide removal zone.

5. The fuel processor of claim 3, wherein the auxiliary water-gas shift reaction zone is an annular reaction zone arranged around the cooler.

6. The fuel processor of claim 1, wherein the inlet of the exothermic partial oxidation zone is in fluid communication with the outlet of the first fluid flow path.

7. The fuel processor of claim 1, wherein the exothermic partial oxidation zone is located at the upper end of the vessel.

8. The fuel processor of claim 1, wherein the steam generator is an evaporator.

9. The fuel processor of claim 8, wherein the evaporator is in the form of a double-walled receptacle, wherein the walls define a water reservoir.

10. The fuel processor of claim 1, wherein the carbon monoxide removal zone contains a catalyst suitable for selectively oxidizing carbon monoxide.

11. The fuel processor of claim 10, wherein the carbon monoxide removal zone comprises two catalyst beds arranged in series.

12. The fuel processor of claim 10, wherein the catalyst in the carbon monoxide removal zone is coated on a metal support.

13. The fuel processor of claim 1, wherein the carbon monoxide removal zone is mounted on a flange.

14. The fuel processor of claim 13, wherein the flange is the bottom of the vessel.

15. The fuel processor of claim 3, wherein a flange is located in the middle of the vessel and wherein the exothermic partial oxidation zone and the water-gas shift reaction zone are located at one side of the flange and the auxiliary water-gas shift reaction zone is located at the other side of the flange.

16. The fuel processor of claim 1, wherein the vessel has a volume of at most about 40 liters.

17. A fuel cell system comprising a fuel processor for converting a hydrocarbonaceous fuel into hydrogen and carbon dioxide comprising:
   (a) a vessel having an at least partly double-walled cylindrical side wall comprising an inner shell and an outer shell, and an outlet;
   (b) a first fluid flow path, defined between the inner shell and the outer shell of the side wall, having an inlet and an outlet;
   (c) an exothermic partial oxidation zone having an inlet and an outlet comprising a catalyst in a fixed arrangement suitable for the partial oxidation of the hydrocarbonaceous fuel with an oxygen-containing gas;
   (d) a steam generator;
   (e) a water-gas shift reaction zone having an inlet and an outlet and containing a catalyst suitable for the water-gas shift conversion reaction;
   (f) a second fluid flow path extending from the outlet of the exothermic partial oxidation zone, along the steam generator, to the inlet of the water-gas shift reaction zone;
   (g) a carbon monoxide removal zone having an inlet and an outlet, which zone contains a catalyst suitable for selectively oxidizing carbon monoxide or for methanation of carbon monoxide;
   (h) a third fluid flow path extending from the outlet of the water-gas shift reaction zone, along the inner surface of the side wall of the vessel, to the inlet of carbon monoxide removal zone, which third fluid flow path is in heat-exchange contact with the first fluid flow path; and
   (i) a fourth fluid flow path extending from the outlet of the carbon monoxide removal zone to the outlet of the vessel, wherein the exothermic partial oxidation zone, the steam generator, the water-gas shift reaction zone, and the carbon monoxide removal zone are contained in the vessel; and, a fuel cell.

18. The fuel cell system of claim 17, wherein the fuel cell comprises a proton exchange membrane fuel cell.

19. A fuel processor for converting a hydrocarbonaceous fuel into hydrogen and carbon dioxide comprising:
   (a) a vessel having a cylindrical side wall and an outlet;
   (b) a first fluid flow path, located in or at the outside of the side wall, having an inlet and an outlet;
   (c) a hydrocarbon conversion zone for converting the hydrocarbonaceous fuel into a product gas comprising carbon monoxide and hydrogen having an inlet and an outlet;
   (d) a steam generator;
   (e) a water-gas shift reaction zone having an inlet and an outlet and containing a catalyst suitable for the water-gas shift conversion reaction;
   (f) a second fluid flow path extending from the outlet of the hydrocarbon conversion zone, along the steam generator, to the inlet of the water-gas shift reaction zone;
   (g) a carbon monoxide removal zone having an inlet and an outlet, which zone contains a catalyst suitable for selectively oxidising carbon monoxide or for methanation of carbon monoxide;
   (h) a third fluid flow path extending from the outlet of the water-gas shift reaction zone, along the inner surface of the side wall of the vessel, to the inlet of carbon monoxide removal zone;
   (i) a fourth fluid flow path extending from the outlet of the carbon monoxide removal zone to the outlet of the vessel;
   (j) an auxiliary water-gas shift reaction zone which is contained in the vessel and which has an inlet and an outlet, which auxiliary water-gas shift reaction zone contains a catalyst suitable for the water-gas shift conversion reaction, and wherein the third fluid flow path extends from the outlet of the water-gas shift reaction zone, along the inner surface of the side wall of the vessel, via the auxiliary water-gas shift reaction zone to the inlet of the carbon monoxide removal zone and includes a cooler between the outlet of the auxiliary water-gas shift reaction zone and the inlet of the carbon monoxide removal zone; and
   (k) wherein a flange is located in the middle of the vessel and wherein the hydrocarbon conversion zone and the water-gas shift reaction zone are located at one side of the flange and the auxiliary water-gas shift reaction zone is located at the other side of the flange.

* * * * *